F. W. MOLDENHAUER & B. G. EDGERTON.
STANCHION.
APPLICATION FILED JAN. 26, 1914.
1,109,933.
Patented Sept. 8, 1914.
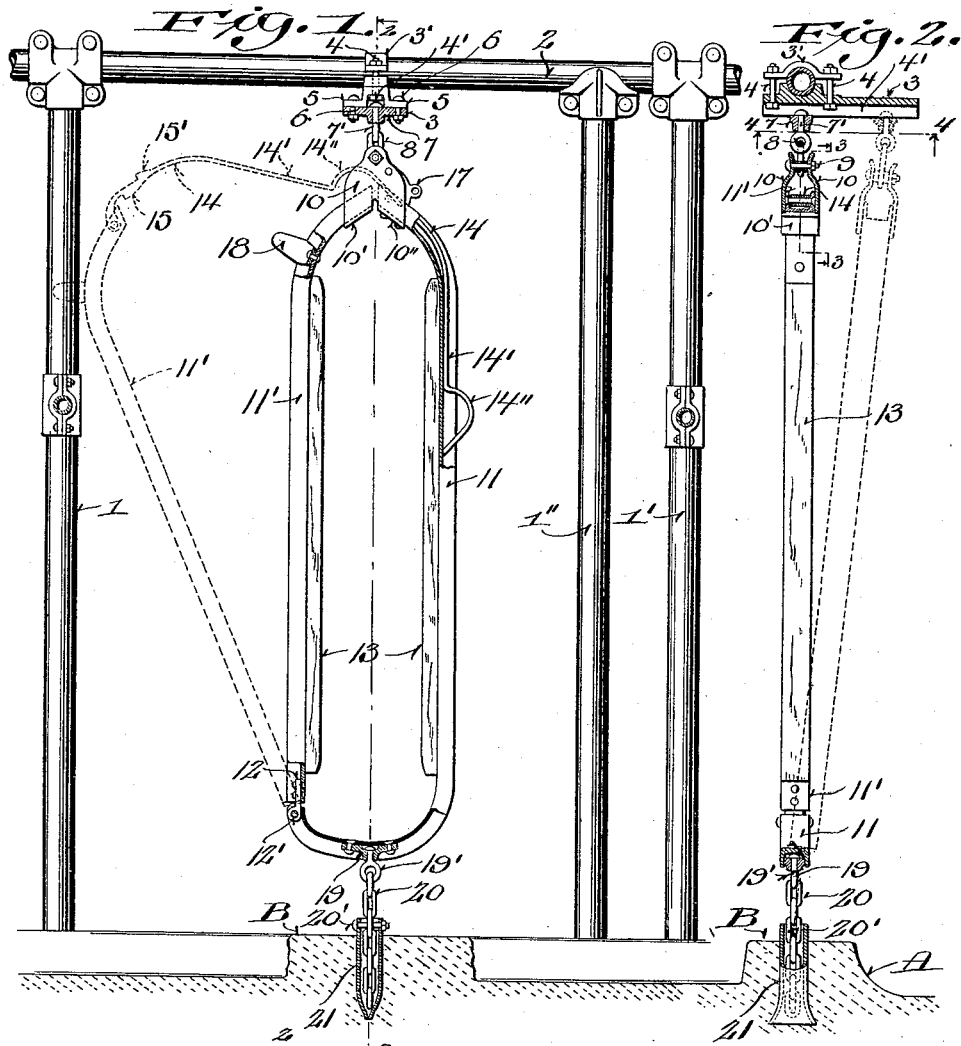
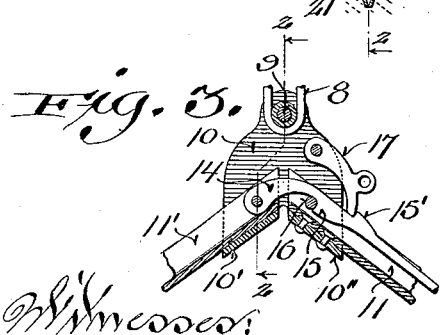
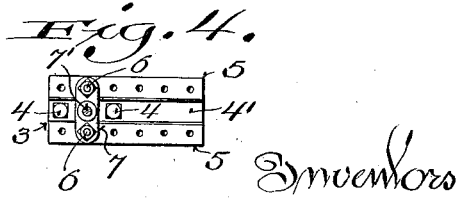

UNITED STATES PATENT OFFICE.

FREDERICK W. MOLDENHAUER AND BENJAMIN G. EDGERTON, OF OCONOMOWOC, WISCONSIN, ASSIGNORS TO WISCONSIN STABLE EQUIPMENT COMPANY, OF OCONOMOWOC, WISCONSIN.

STANCHION.

1,109,933.  Specification of Letters Patent.  Patented Sept. 8, 1914.

Application filed January 26, 1914. Serial No. 814,326.

*To all whom it may concern:*

Be it known that we, FREDERICK W. MOLDENHAUER and BENJAMIN G. EDGERTON, both citizens of the United States, and residents of Oconomowoc, in the county of Waukesha and State of Wisconsin, have invented certain new and useful Improvements in Stanchions; and we do hereby declare that the following is a full, clear, and exact description thereof.

Our invention refers to cow stanchions and has for its object to provide a simple, economical and effective device of the above mentioned character.

With the above object in view the invention consists in certain peculiarities of construction and combination of parts as hereinafter set forth with reference to the accompanying drawings and subsequently claimed.

In the drawings Figure 1 represents a face view of a stanchion embodying the features of our invention, with parts broken away and parts in section to more clearly illustrate certain structural features; Fig. 2, a longitudinal section of the same, the section being indicated by line 2—2 of Figs. 1 and 3; Fig. 3, an enlarged sectional view of the saddle head utilized for confining the upper ends of the stanchion members, the section being indicated by line 3—3 of Fig. 2, and Fig. 4, an inverted plan view of a suspension bracket mechanism with a link retaining eye in section as indicated by line 4—4 of Fig. 2.

Referring by characters to the drawings, 1, 1', represent vertical pipes connected by a horizontal overhead pipe 2, the same constituting a supporting frame for the series of stanchions, which members are disposed in the usual position just rearward of the feed trough A and aline with a sill B at the head of the stalls.

A stanchion suspension bracket 3 is confined to the overhead frame member 2 by a clip 3' and retaining bolts 4, which bolts clamp the clip and bracket together, the heads of said bolts being seated within a longitudinal channel 4' formed in said bracket. The bracket is provided with perforated flanges 5 paralleling the channel 4', which flanges and channel for the most part extend to one side of the frame member 2, whereby the position of the bracket may be reversed to vary the scope of its adjustment in order that the stanchion can be suspended within selected positions either back of or forwardly of the overhead frame member. In this instance the bracket is shown forwardly disposed relative to the frame and sill B. Secured by bolts 6, through companion perforations of the flanges 5, is a block 7 having a centrally disposed swivel-bolt 7', the head of which is positioned within the bracket channel, while the eye serves as a retainer for a link 8. The said link engages a sleeved bolt 9 that confines the side webs 10 of a saddle-head, which saddle-head is provided with oppositely disposed oblique bottom seats 10', 10'', that connect the spaced webs.

As best shown in Fig. 3 the bottom seat 10'' has riveted thereto the upper inwardly bowed end of a channel iron stanchion member 11, the side webs of which fit snugly against the inner walls of the saddle-head side webs. The lower or throat end of said stanchion member is bowed to the width of the stanchion and terminates with pintle 12, upon which pintle is mounted a leaf 12', the same being secured to the lower end of a hinged stanchion member 11'. This hinged stanchion member, with the exception of the bowed bottom, is similar to the stanchion member 11 and each of said members are provided with straight stretches having wood lining strips 13, as shown. The upper inwardly bowed end of the hinged stanchion member 11' has pivoted thereto the shank end of a bail 14 having oppositely disposed inner and outer teeth 15, 15', respectively, positioned adjacent to its pivot point. This bail constitutes a hinged extension of stanchion member 11' and its free end is adapted to play back and forth within the saddle-head, being provided with a straight stretch 14', which stretch nests within the webs of channel iron stanchion member 11 when the stanchion is closed. The straight stretch 14' of the bail ends with offset hand-grip 14'', whereby said bail is conveniently manipulated.

When the stanchion is closed its members are locked by engagement of the inner bail tooth 15 with a cross-pin 16, which cross-pin connects the webs of saddle-head and also passes through the side webs of the fixed stanchion member. Thus it is manifest that the bail forms a gravity lock for the stanchion members.

To prevent inadvertent opening of the stanchion by the confined animal exerting strain upon the bail that may tend to spring its locking connections, we provide an auxiliary safety tumbler 17, which tumbler is pivoted between the webs of the saddle-head, its nose being arranged to engage the outer tooth 15' of said bail.

By utilizing the above described double lock it is apparent that before the stanchion can be opened manual release must be effected first in connection with the tumbler and thereafter by swinging up the bail.

When the stanchion is open, as indicated by dotted lines in Fig. 1, it will be seen that an irregular oval is formed by the stanchion members in conjunction with the bail and in this position the said stanchion is prevented from twisting out of its animal receiving position by a stirrup 18, that is secured to the stanchion member 11', which stirrup straddles the juxtaposed upright frame member 1.

To prevent the animal from thrusting its head between the fixed stanchion member 11 and the contiguous vertical frame member 1', we employ the usual vertically disposed stalling bar 1'', which stalling bar is connected at its upper end to the horizontal frame member 2, the lower end thereof being embedded into the concrete sill B.

A clip 19 is secured to the bowed throat portion of the stanchion member 11, the same carrying a swivel-eye 19' from which depends a chain section 20 that is alined with the upper stanchion suspension means. The free end links of the chain section 20 are arranged to enter a tubular well 21, which well is for the most part sunken and anchored within the concrete sill. The bottom of the well 21 is flattened in one direction to produce a flare in the opposite direction, whereby said well is rigidly secured and its exposed open mouth is provided with alined apertures for the reception of an anchor bolt 20', which bolt may be inserted in any one of the lower chain section links, whereby more or less play is obtained relative to the throat end of the stanchion. Thus it will be seen that the loose end links are incased within the well and are thereby not liable to injure the animal by whipping about. It is also obvious that the adjustable suspension means for the stanchion permits ample floating play to compensate for free movement of the confined animal and that the simplicity of construction renders it possible to manufacture these devices at a minimum cost, particular attention being called to the fact that there are no finely adjusted parts to get out of order or to wear loose.

We claim:

1. A stanchion comprising an overhead frame member and a sill, a bracket having a central channel and apertured side flanges, a clip connecting one end of the bracket with the frame member, a block, a swivel depending therefrom, bolts fitted into selected pairs of the flange apertures for securing the block, a saddle head having a bolt connected side web, a link connecting the bolt and the block swivel, a stanchion member rigidly secured to the saddle, means connecting the lower end of the stanchion member and the sill, a stanchion member hingedly secured to the lower end of the first mentioned stanchion member, and locking means connecting the free end of the hinged stanchion member and the saddle-head.

2. A stanchion comprising an overhead frame member and a sill, a bracket having a central channel and apertured side flanges, a clip connecting one end of the bracket with the frame member, a block, a swivel depending therefrom, bolts connecting the block to selected pairs of the flange apertures, a saddle in link connection with the block, and stanchion members carried by the saddle.

In testimony that we claim the foregoing we have hereunto set our hands at Oconomowoc, in the county of Waukesha and State of Wisconsin in the presence of two witnesses.

FREDERICK W. MOLDENHAUER.
BENJAMIN G. EDGERTON.

Witnesses:
H. L. KELLOGG,
N. C. COYLE.

---

Copies of this patent may be obtained for five cents each, by addressing the "Commissioner of Patents, Washington, D. C."